3,090,775
PROCESS FOR CURING FLUOROCARBON ELAS-
TOMERS WITHOUT FOAMING THEREOF
John F. Smith, Brandywine Hundred, Del., assignor to
E. I. du Pont de Nemours and Company, Wilmington,
Del., a corporation of Delaware
No Drawing. Filed Apr. 7, 1960, Ser. No. 20,540
1 Claim. (Cl. 260—87.7)

This invention relates to a curing process for fluorocarbon elastomers and more particularly to an improved process for curing fluorocarbon elastomers whereby sponging is avoided.

Fluorocarbon elastomers are especially valuable because of their thermal stability and their good resistance to a wide variety of solvents, oils, fuels and the like, particularly at high temperatures. Thus, they are being increasingly used in the manufacture of tubing employed as aircraft hose for carrying fuels, lubricants, and the like at high temperatures and pressures. They are also finding applications as O ring seals for gaskets and as diaphragms for control devices.

The processes presently known for curing fluorocarbon elastomers leave something to be desired. Sponging or foaming of the compounded stocks may occur when they are heated in air before curing has been finished. This outcome is particularly likely when thick, lightly-cured sections are being treated.

It is an object of the present invention to provide an improved process for curing fluorocarbon elastomers. A further object is to provide a process whereby fluorocarbon elastomers are cured without sponging or foaming. A still further object is to provide an improved process for curing thick sections of fluorocarbon elastomers. Other objects will appear hereinafter.

These and other objects of this invention are accomplished by a process for curing a fluorocarbon elastomer which comprises incorporating therewith, per 100 parts by weight of said fluorocarbon elastomers, (a) from 2 to 8 parts by weight of an organic peroxide or from 0.5 to 3.0 parts by weight of the carbamate of a 2 to 6 carbon atom alkylenediamine and (b) from 5 to 20 parts by weight of magnesium oxide followed by the step of heating the compounded stock at 100° C. to 200° C. so as to effect a cure, with the proviso that from 5 to 20 parts by weight of calcium oxide is incorporated into said fluorocarbon elastomer prior to heating. The use of calcium oxide in conjunction with magnesium oxide, an organic peroxide or the alkylene-diamine carbamate results in a highly improved process for curing fluorocarbon elastomers in that it permits the curing of thick sections of these elastomers without sponging.

The fluorocarbon elastomers which may be cured according to the process of the present invention include (a) a vinylidene fluoride-hexafluoropropene copolymer containing from 30 to 70 percent by weight of vinylidene fluoride and from 70 to 30 percent by weight of hexafluoropropene and (b) a copolymer of vinylidene fluoride, hexafluoropropene and tetrafluoroethylene containing from 3 to 35 percent by weight of tetrafluoroethylene units, the balance being vinylidene fluoride and hexafluoropropene units, with the weight ratio of vinylidene fluoride units to hexafluoropropene units having a value ranging from 2.33:1 to 0.667:1.

In order that the copolymers of vinylidene fluoride and hexafluoropropene be elastomeric, it is necessary that they contain from about 30 to about 70 percent by weight of vinylidene fluoride units with a preferred elastomeric copolymer containing between about 53 and 70 percent by weight of vinylidene fluoride units. The copolymers of vinylidene fluoride and hexafluoropropene are described in "Industrial and Engineering Chemistry," vol. 49, p. 1687 (1957), French Patent 1,153,164, Italian Patent 553,285 and British patent specification 789,786.

The other elastomeric copolymers, which may be used, contain from 3 to 35 percent by weight of tetrafluoroethylene units, the balance being vinylidene fluoride and hexafluoropropene units, with the weight ratio of vinylidene fluoride units to hexafluoropropene units having a value ranging from 2.33:1 to 0.667:1. The weight ratio of vinylidene fluoride to hexafluoropropene corresponds to a range of 70 to 40 percent by weight of vinylidene fluoride and 30 to 60 percent by weight of hexafluoropropene monomer units. Within this ratio the copolymer is elastomeric. When the proportion of hexafluoropropene to vinylidene fluoride drops below about 30 percent the products are plastic rather than elastic. On the other hand, about 60 percent is the largest proportion of hexafluoropropene which yields a satisfactory elastic copolymer. In the same vein, the content of tetrafluoroethylene units should not exceed about 35 percent by weight of the total copolymer if the elastomeric properties of the copolymer are to be retained. A preferred range of composition for the copolymers used in the present invention consists of 15 to 25 percent by weight of tetrafluoroethylene units and 85 to 75 percent by weight of vinylidene fluoride and hexafluoropropene units, the vinylidene fluoride and hexafluoropropene units being present in a weight ratio within the range of 2.33:1.0 to 0.667:1.0.

These copolymers are made by copolymerization of a mixture of the monomers using well known polymerization conditions. Preferably the familiar aqueous redox polymerization system is used. Polymerization may be initiated by the use of the ammonium persulfate-sodium bisulfite system. Polymerization is normally accomplished under pressure at moderately elevated temperatures.

The curing agents which are used in the subject process include alkylenediamine carbamates and organic peroxides.

The alkylenediamine carbamates correspond to the general formula

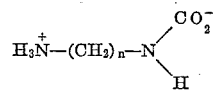

where $n$ is an integer having a value of 2 to 6. Representative examples of these carbamates are ethylenediamine carbamate and hexamethylenediamine carbamate.

The organic peroxides useful in the subject process should be stable at temperatures below about 50° C. in order to minimize the safety hazards attending their use and to avoid the need for costly cooling procedures. The general classes of useful organic peroxides include alkyl hydroperoxides, dialkyl peroxides, cycloperoxenes, diacyl peroxides, and alkyl peroxy esters. In general, it is preferred that the alkyl members be tertiary. Representative examples include benzoyl peroxide, di-tertbutyl peroxide, and dicumyl peroxide. Further representative examples are disclosed in volume 10 of Chemical Technology, edited by R. E. Kirk and D. F. Othmer, Interscience Encyclopedia, Inc., N.Y., 1953. These are tertiary alkyl hydroperoxides (page 61, Table I); ditert-alkyl peroxides (page 67, Table II); cycloperoxenes (page 67); di long chain acyl peroxides, e.g. dilauroyl peroxide (page 73, Table IV); and tertiary alkyl peroxy esters (page 77, Table VI). In addition to dicumyl peroxide, other diaralkyl peroxides can be employed having the general structure

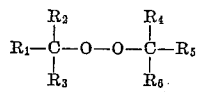

where $R_1$ and $R_6$ are aryl radicals, such as phenyl radicals, and $R_2$, $R_3$, $R_4$, and $R_5$ are either hydrogen atoms or $C_1$–$C_3$ alkyl radicals. Representative examples are given in U.S. Patent 2,826,570.

The curing agents of this invention are incorporated into the fluorocarbon elastomer by conventional methods such as by milling in heavy-duty mixers or on the usual rubber milling equipment. Ordinarily, water-cooled milling equipment will be used so that curing or crosslinking temperatures are not reached. Although the curing agents can be added in any order, it is preferred to introduce the peroxide last in order to avoid the possibility of scorching.

For each 100 parts by weight of the fluorocarbon elastomer, (a) about 2 to 8 parts by weight of an organic peroxide or about 0.5 to 3 parts by weight of the carbamate of a $C_2$–$C_6$ alkylenediamine, (b) about 5 to 20 parts by weight of magnesium oxide, and (c) about 5 to 20 parts of calcium oxide are incorporated. When lesser amounts of the magnesium oxide and the peroxide (or carbamate) are present, the vulcanizates are undercured. A brittle, stiff overcured vulcanizate results when greater amounts of these reagents are used. A spongy vulcanizate is obtained when less than 5 parts of calcium oxide is incorporated whereas concentrations above 20 parts are unnecessary uneconomical.

After the fluorocarbon elastomer has been completely compounded, the stock obtained is cured by heating. In general, temperatures between about 100 and 200° C. are used. Less time is needed for cures at higher temperatures than for cures at lower temperatures in this range. The shape of the stock being processed will also determine the amount of time needed. Thicker stocks require more time than thinner stocks do. Those skilled in the art can readily determine the proper conditions.

As has been mentioned earlier, thicker sections are more difficult to cure than thinner sections because the tendency toward sponging is accentuated as the thickness is increased. Heretofore, attempts have been made to minimize or avoid sponging by a 2-stage curing cycle wherein the molded fluorocarbon elastomer is heated successively in a press and in an air-circulating oven. As is shown in Example I which follows, such an approach may not be satisfactory where the fluorocarbon elastomer is compounded with only the conventional reagents. However, when calcium oxide is added to the fluorocarbon elastomer according to the present invention, sponging is avoided and satisfactory vulcanizates are obtained.

In general, it is preferred to begin the curing at about 150° C. in a press and to finish it in an oven at about 200° C. About 5 to preferably 60 minutes is allowed for the first step; the stock is undercured if the heating time is less than 5 minutes; periods beyond an hour are unnecessary and uneconomical. It is to be understood that while press molding may be necessary when a shaped article is being prepared, it is not a critical feature of this invention. As long as the concentration of calcium oxide called for is supplied, the stock will cure without sponging in the absence of pressure. In order to avoid aftercure during high temperature use, the stock should be heated at 200° C. for at least 10 hours in the presence of air; 18 to 20 hours is preferred. The compression set of the vulcanizate leaves something to be desired when periods less than 18 hours are employed and aftercuring during high temperature use may occur. Periods beyond 20 hours are unnecessary and uneconomical.

Fillers and reinforcing agents, such as carbon blacks and the known wide variety of mineral fillers, may be employed in varying quantities such as from 10 to 60 parts, depending upon the degree of hardness, heat resistance and stability in general desired in the cured product. The carbon blacks may be those normally used in elastomers, such as thermal, furnace and channel blacks. Mineral fillers including the fine silicas, clays and diatomaceous earth, may be used. Alkaline fillers such as alkaline carbon blacks and silicas are preferred. Pigments may be incorporated for color effects.

The following example will better illustrate the nature of the present invention; however, the invention is not intended to be limited to this example. Parts are by weight unless otherwise indicated.

EXAMPLE

I. *Description of Copolymer*

A. VINYLIDENE FLUORIDE ($VF_2$)/HEXAFLUOROPROPENE (HFP) COPOLYMER

Copolymer A is a 60/40 weight percent copolymer of $VF_2$ and HFP. It has an inherent viscosity (.1 g. copolymer in 100 cc. of an 87/13 weight percent tetrahydrofuran (THF)/dimethyl formamide (DMF) mixture at 30° C.) of .95±.05, a Mooney viscosity (ML 10 at 100° C.) of 75±6 and a number-average molecular weight of about 100,000.

The general procedure for preparation of a copolymer of this type is given in "Industrial and Engineering Chemistry" 49, 1687 (1957).

II. *Curing Procedure*

Eight stocks (1A–1H) were compounded on a cold rubber roll mill according to the recipe given in Table I below. The organic peroxide was added last. The stocks thereby obtained were heated in 3 x 6 x ¼″ molds in a press at 150° C. for one hour. Subsequently they were removed from the molds and heated in a circulating air oven at 200° C. for 18 hours to complete the cure. Stocks 1A, 1C, 1E, and 1G, which did not contain calcium oxide gave spongy vulcanizates. Stocks 1B, 1D, 1F, and 1H, which contained calcium oxide, gave satisfactory solid vulcanizates.

TABLE I

| Component | Stocks | | | | | | | |
|---|---|---|---|---|---|---|---|---|
|  | 1A | 1B | 1C | 1D | 1E | 1F | 1G | 1H |
| Copolymer A | 100 | 100 | 100 | 100 | 100 | 100 | 100 | 100 |
| MgO | 15 | 15 | 15 | 15 | 15 | 15 | 15 | 15 |
| "Hi-Sil" [1] | 15 | 15 | 15 | 15 | 15 | 15 | 15 | 15 |
| Silicone Oil [2] | 3 | 3 | 3 | 3 | 3 | 3 | 3 | 3 |
| CaO |  | 15 |  | 15 |  | 15 |  | 15 |
| Benzoyl Peroxide | 2 | 2 |  |  |  |  |  |  |
| Dicumyl Peroxide |  |  | 2 | 2 |  |  |  |  |
| Ditertiarybutyl Peroxide |  |  |  |  | 2 | 2 |  |  |
| Ethylenediamine Carbamate |  |  |  |  |  |  | 0.5 | 0.5 |
| Sponging | Yes | No | Yes | No | Yes | No | Yes | No |

[1] Precipitated hydrated silica of very fine particle size (has a particle size of about 0.022 micron and a surface area of 150 square meters per gram and contains 10.7% of water of hydration, corresponding to 0.073 gram of water per 100 square meters of surface area). Commercially available from Columbia-Southern Corporation, Pittsburgh, Pennsylvania.
[2] A polydimethyl siloxane having a viscosity of 350 centistokes at 25° C.

As many widely different embodiments of this invention may be made without departing from the spirit and scope thereof, it is to be understood that this invention is not limited to the specific embodiments thereof except as defined in the appended claim.

What is claimed is:

A process for preventing foaming of a fluorocarbon elastomer during curing by heating at a temperature between about 100° C. and 200° C., said fluorocarbon elastomer being selected from the group consisting of a vinylidene fluoride-hexafluoropropene copolymer containing from about 30 to 70 percent by weight of vinylidene fluoride and from about 70 to 30 percent by weight of hexafluoropropene and a vinylidene-hexafluoropropene-tetrafluoroethylene copolymer containing from about 3 to 35 percent by weight of tetrafluoroethylene units, the balance being vinylidene fluoride and hexafluoropropene units with the weight ratio of vinylidene fluoride units to hexafluoropropene units having a value ranging from 2.33:1 to 0.667:1, said fluorocarbon elastomer containing a curing agent selected from the group consisting of about 2 to 8 parts by weight of an organic peroxide which is stable at temperatures below 50° C. and about 0.5 to 3 parts by weight of the carbamate of an alkylene diamine having from 2 to 6 carbon atoms, which process comprises incorporating into said fluorocarbon elastomer prior to heating about 15 parts by weight of magnesium oxide and about 15 parts by weight of calcium oxide.

References Cited in the file of this patent

UNITED STATES PATENTS

| | | |
|---|---|---|
| 2,820,776 | Robb et al. | Jan. 21, 1958 |
| 2,833,752 | Honn et al. | May 6, 1958 |
| 2,941,987 | Dewey | June 21, 1960 |
| 2,944,995 | Dosmann | July 12, 1960 |
| 2,951,832 | Moran | Sept. 6, 1960 |